United States Patent
Taylor

(10) Patent No.: US 9,264,517 B2
(45) Date of Patent: Feb. 16, 2016

(54) WIDE AREA AGGREGATED COMMUNICATIONS

(71) Applicant: VMware, Inc., Palo Alto, CA (US)

(72) Inventor: Frank Stephen Taylor, Hertfordshire (GB)

(73) Assignee: VMWare, Inc., Palo Alto, CA (US)

( * ) Notice: Subject to any disclaimer, the term of this patent is extended or adjusted under 35 U.S.C. 154(b) by 129 days.

(21) Appl. No.: 14/184,593

(22) Filed: Feb. 19, 2014

(65) Prior Publication Data

US 2015/0237081 A1 Aug. 20, 2015

(51) Int. Cl.
*G06F 15/173* (2006.01)
*H04L 29/06* (2006.01)

(52) U.S. Cl.
CPC .................. *H04L 67/42* (2013.01)

(58) Field of Classification Search
USPC ................. 709/223, 226, 219, 203
See application file for complete search history.

(56) References Cited

U.S. PATENT DOCUMENTS

| | | | |
|---|---|---|---|
| 6,691,116 B1 * | 2/2004 | Bart .................. | G06F 17/30569 |
| 8,301,645 B1 * | 10/2012 | Crook ............... | G06F 17/30067 |
| | | | 707/755 |
| 8,769,226 B2 | 7/2014 | Wilk | |
| 8,892,689 B1 | 11/2014 | Mowry | |
| 2005/0050013 A1 | 3/2005 | Ferlitsch | |
| 2006/0047742 A1 * | 3/2006 | O'Neill .................. | H04L 49/25 |
| | | | 709/203 |
| 2008/0086567 A1 | 4/2008 | Langen et al. | |
| 2012/0278287 A1 | 11/2012 | Wilk | |
| 2014/0303934 A1 | 10/2014 | Mylarappa et al. | |

* cited by examiner

*Primary Examiner* — El Hadji Sall

(57) ABSTRACT

Methods, systems, and techniques for federating operations, in an optimized way using wide area networks are provided. Example systems provide an API for generating and handling federated requests as an aggregation. In one example Wide Area Network Aggregation System, WANAS provides an API, a connection manager, and connection iterators to manage inter-site connections and requests, and inter-pod requests and messaging. These components cooperate to distribute a task across multiple physically disparate sites using a representative connection to the site and fan out of requests to other pods within the site.

20 Claims, 11 Drawing Sheets

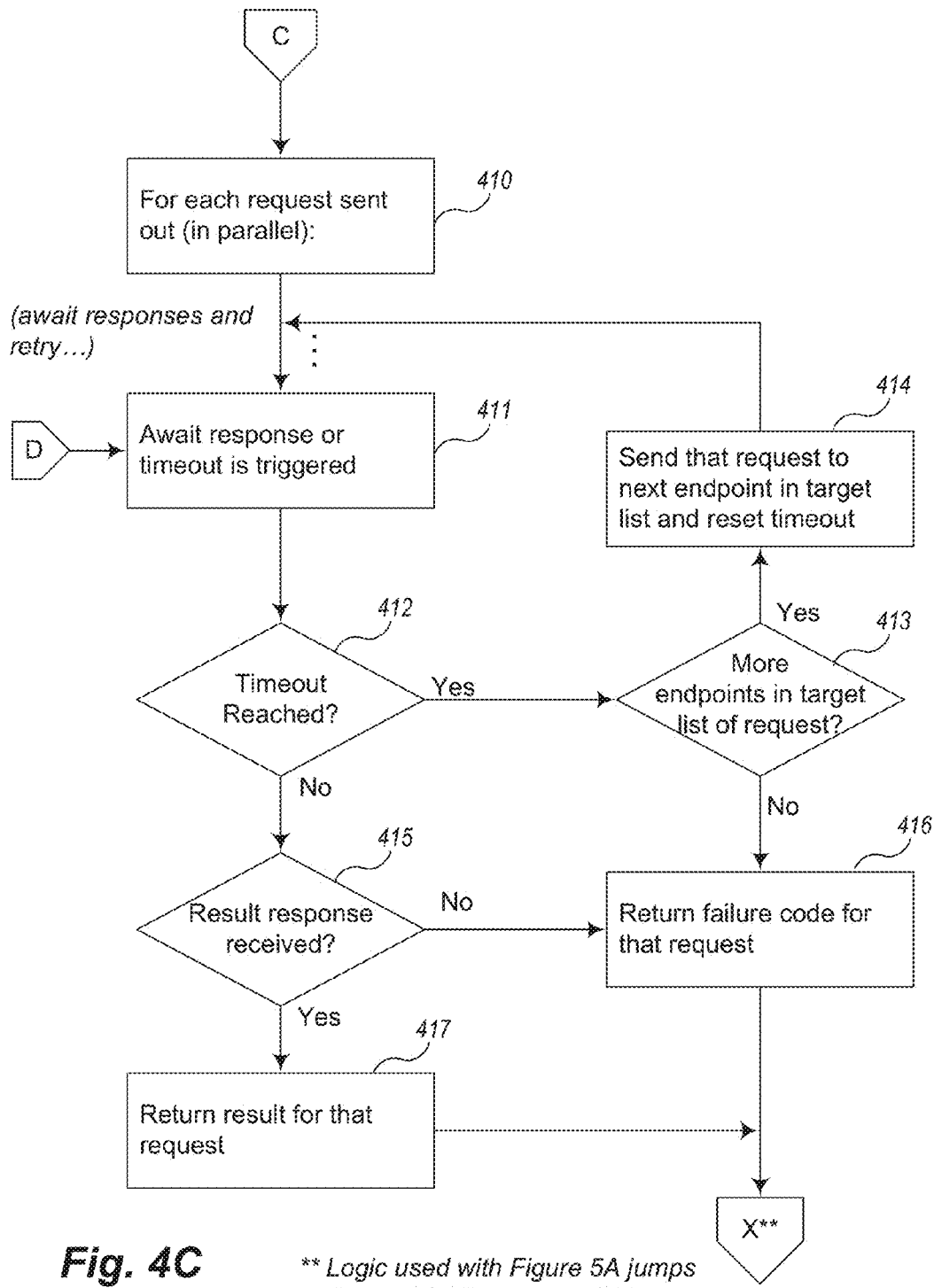
Fig. 4C  ** Logic used with Figure 5A jumps to Figure 5C "E" instead of "X"

WIDE AREA AGGREGATED COMMUNICATIONS

CROSS-NOTING TO RELATED APPLICATIONS

This Application is related by subject matter to U.S. patent application Ser. No. 14,184,518 filed on the same day as this Application, which is incorporated herein by reference.

TECHNICAL FIELD

The present disclosure relates to methods, techniques, and systems for communication across wide area networks and, in particular, to methods, techniques, and systems for communicating between a plurality of sites, with potentially multiple endpoints, using multi-endpoint targets to link the sites or perform federated operations.

BACKGROUND

Connections across wide area networks are typically slow and may incur high latency or, even in some cases, be unreliable. Often times it becomes important to communicate with one or more systems across such networks while minimizing latency and maximizing bandwidth. For example, in large datacenter installations, each of which may support thousands of virtual remote desktops, it may be important to locate resources across many, perhaps even physically disparate sites, which are connected by wide area networks.

For example, a request from a first datacenter at one site to find a resource in another datacenter at a physically disparate second site connected over a wide area network (a WAN) may cause performance issues simply because the target server is connected via a WAN connection. In order to successfully find a server at the second site that can access the required resource, multiple WAN operations may be incurred, which are inherently slower compared to local area network operations typically used within the datacenter. This latency ultimately may not be acceptable in certain situations, such as to connect a user to his/her virtual desktop, especially when the user might be used to apparent immediate access (or close to immediate access) when attempting to connect to a desktop that resides within the user's "home" datacenter (at the first site).

BRIEF DESCRIPTION OF THE DRAWINGS

FIGS. 4A, 4B, 4C, and 4D are an example flow diagram of computing logic to process an aggregation request across multiple computing sites by sending local and site requests.

DETAILED DESCRIPTION

Figure 1:
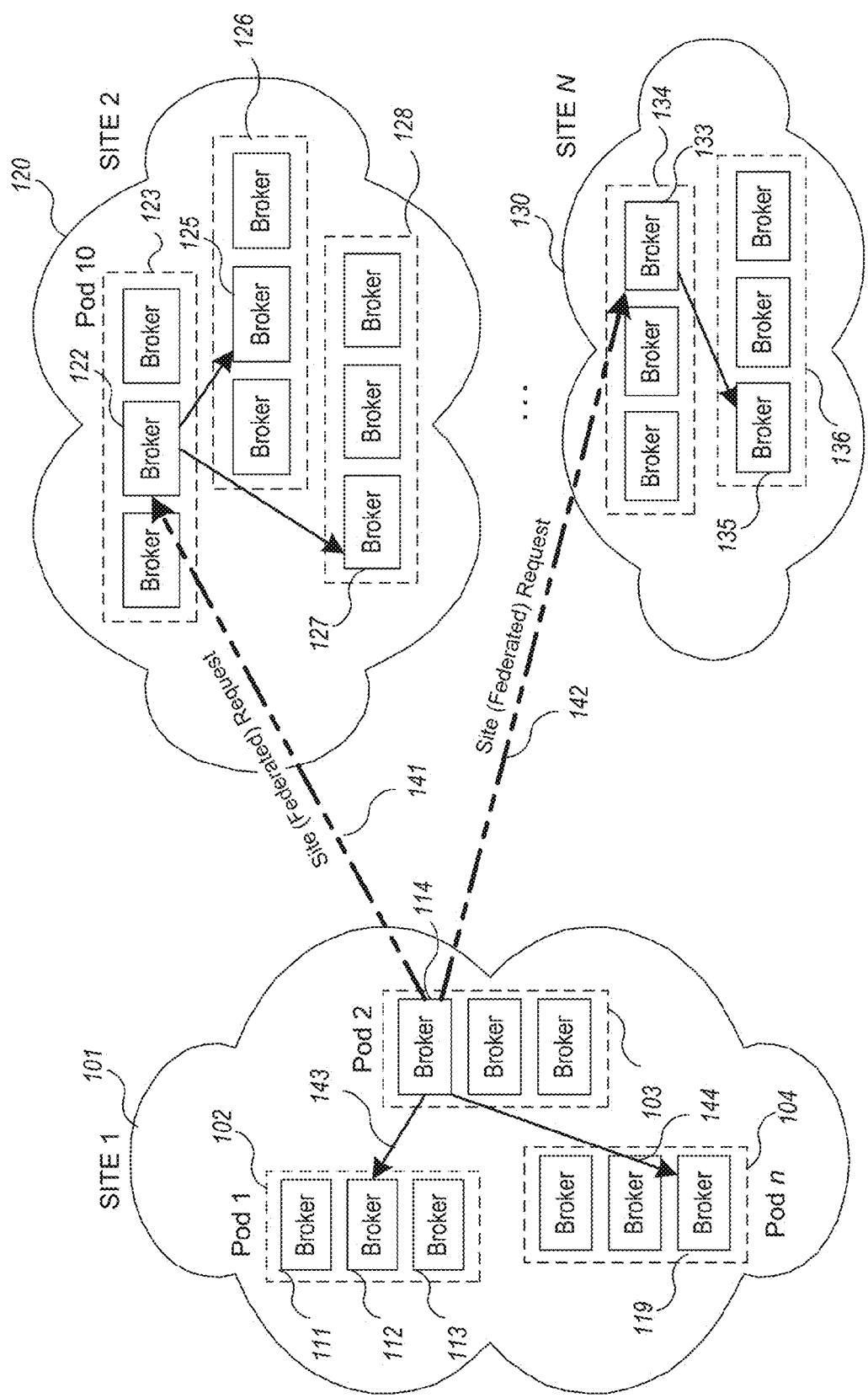
FIG. 1 is a block diagram of an example computing environment enhanced with Wide Area Network Aggregation technology to provide more reliable access with less latency across physically disparate computing sites.

Examples described herein provide enhanced computer- and network-based methods, systems, and techniques for aggregated communication across wide area networks to minimize failure and latency. Examples provide a Wide Area Network Aggregation System ("WANAS") and corresponding technology ("WANA" technology), which provides an Application Programming Interface ("API") to enable a client (client code, client logic, and the like) executing at a source computing site (e.g., a datacenter) to make a single request (referred to herein as an aggregated request, or a request for a federated operation) for a resource which is then transformed into individual site requests by the API, and then automatically propagated to physically disparate computing sites (e.g., other datacenters) using a single connection to a representative target of each site. Accordingly, the site requests can be processed in parallel. The target (receiving or recipient) computing site is then responsible for "fanning out" (e.g., spreading, transmitting the requests, for example, in parallel, forwarding to others, and the like) the site request using local requests to individual pods (e.g., groups of servers, virtualization infrastructure installations, and the like) that comprise the computing site. The pods within a computing site are typically connected to each other via a local area network ("LAN") and thus communication between the pods within a site using local requests is typically faster than over a wide area network ("WAN"). The fan out of the site request using local requests allows for parallelism of execution of the site request amongst all the pods in a computing site. Since the site requests are also sent in parallel from the client using a single connection to each remote computing site, then the entire federated operation can be executed with a large degree of parallelism, thus reducing latency.

In addition, each request supported by the WANA technology specifies a request target that is a list of equivalent (server) endpoints that can respond to the request. The technology supports mechanisms on the receiving end which allow for failover to other endpoints that can respond. A connection "iterator" is defined for each request that knows how to cycle through the target list of equivalent endpoints and "fail over" to a next server in the list upon encountering a (configurable) timeout. For example, the fan out of a site request to a local request to each pod specifies as a target a list of the equivalent servers within the pod that can respond. Failover of the request to the next server in the list is automatically managed by the connection iterator. This avoids multiple roundtrip messages across the WAN when errors, such as failed or unavailable servers, are encountered.

In addition, requests are preferably executed across pre-established connections formed by a connection manager which executes on each server. The connection manager provides and manages the life cycle of pre-established connections between servers within a computing site. When one connection fails, another can be established, thus providing an additional type of failover, load balancing, and any other reason for choosing one connection over another, configurable or not. Also, the parallelism and automatic fan out provided by sharing pre-established connections can reduce the number of multiple concurrent connections across the WAN required when a broker in one pod needs to communicate with brokers in multiple other pods at one or more remote sites for responding to a single request.

Although described with reference to operations federated across physical computing sites, the techniques of a WANAS may be useful to support a variety of other messaging communications as well. For example, the local requests within a computing site and within a pod may be different from the site requests and/or from the initial aggregation request allowing for flexibility. In addition, in some example WANASes, a single (WAN) connection to a target computing site may support multiple requests concurrently or in sequence, that are potentially from different clients within the same broker, thus effectively providing a shared connection. Sharing a connection allows elimination of the setup and tear down time associated with establishing WAN connections, thus effectively reducing latency by using an already existing connection.

FIG. 1 is a block diagram of an example computing environment enhanced with Wide Area Network Aggregation technology to provide more reliable access with less latency across physically disparate computing sites. FIG. 1 illustrates three physically disparate, separate, and remote computing sites: Site 1 (101), Site 2 (120), and Site N (130). The "N" or "n" indicates that any number of sites, pods, etc. may be accommodated. Each site comprises one or more pods, a unit of infrastructure, which is typically a tightly clustered group of servers, here termed "brokers." For example, site 101 comprises three pods, pod 102, pod 103, and pod 104, shown in dashed line, as the grouping may by logical or physical. Each pod may comprise multiple brokers (such as connection brokers, servers, computing systems, logic) available to process a request. As illustrated, pod 102 comprises three brokers 111-113. Pods 103 and 104 also comprise three brokers, although it is not necessary for each pod to support the same number of brokers. Site 120 (Site 2) also comprises three pods 123, 126, and 127, each respectfully containing three brokers. Site 130 (Site N) comprises two pods 134 and 136, each with three brokers. Other arrangements, layouts, and numbers of sites, pods, and brokers are also possible and contemplated. Also, in one example WANAS, a federated operation may be fanned out to up to 200 physical computing sites or up to 200 pods, although other WANASes may support up to other numbers of sites and/or pods.

In one example of the WANAS, the computing sites constitute a virtualization environment comprising a multitude of datacenters that desire to communicate to locate or provision virtualization resources, such as virtual desktops, and to manage user connections across the remote sites. This allows for a cooperative virtualization environment that can span geographic locations, important in the mobile workforce of today in order to ensure fast user response time and locate a user's applications, data, and work environment no matter where the user is located. Each datacenter typically supports one or more pods, which are typically virtualization infrastructure installations, an example of which is described below with respect to FIG. 2. In one example, the pod unit of infrastructure is a VMWARE® VIEW (now VMWARE HORIZON VIEW™) installation. Each such installation, for example, may support a large number of users, such as up to 10,000 users. Thus, an entire data center may support hundreds of thousands of users, enabling the WANAS to support millions of users. Using WANAS, the pods cooperate across the datacenters to form a "distributed brokering system"—a federation for support of virtualization activities and resources.

FIG. 1 also illustrates how a federated operation (aggregate request) is used to generate (e.g., formulate, create, configure, etc.) parallel site requests that are proliferated to all of the connected remote sites in a WAN environment. Suppose a user has a "home" location somewhere in a remote datacenter, say the datacenter of Site N 130, but is currently using a server in Pod 2 (pod 103). The user, who is on the road traveling, wants to login to one of his running virtual desktops, and to do so, expects to be presented with a list of all of his virtual desktops, running and otherwise. Since the state of the user's desktops is not just local to pod 103, the virtualization environment needs to query each of the other datacenters to find all of the user's virtual desktops and their current state (logged in, available, etc.). A connection broker, broker 114, running on pod 103 responds to the user's query, by initiating an "aggregation request" (containing the federated operation, for example "query virtual desktops and state") by incorporating the WANAS API. The WANAS API implementation executing on connection broker 114 accesses topology data for the virtualization environment, transforms (e.g., translates, reconstructs, generates, remodels, etc.) the request into four different requests: two are site requests 141 and 142 to be sent over WAN to remote datacenters, sites 120 and 130, respectively; and two are local requests 143 and 144 to be sent over LAN to other pods (virtualization infrastructure installations) 102 and 104 within the same datacenter, all requesting information regarding the state of that user's desktops. Programming logic (instructions, code, threads, tasks, programs, etc.) running on connection broker 114 is responsible for aggregating the responses into an overall status presentation in response to the user's request.

Each site request 141 and 142 is forwarded (sent, transmitted, propagated, etc.) in parallel (as opposed to sequentially) to a different remote datacenter, e.g., datacenters 120 and 130. In particular, each site request designates a list of all of the connections brokers in all of the pods in a target datacenter. Thus, for example, site request 141 specifies that information is desired regarding the user's virtual desktops in datacenter 120, and is sent to a target list of equivalent broker endpoints, including all of the connection brokers shown in pods 123, 126, and 128 (9 connection brokers). One of the pre-established connections to broker 114 is used to communicate the site request to one of the brokers that can represent the site, here broker 122. Broker 122 recognizes (determines, realizes, calculates, computes, etc.) that the request is a site request and so is responsible for not only obtaining a result of the inquiry for the installation it represents, but aggregating its own result with results from all of the other installations in the datacenter to which it belongs. If for some reason broker 122 is unavailable or does not respond within a determined time period, the site request automatically will be sent, by a connection iterator executing as part of the site request, to another (representative) broker within the target datacenter, based upon the target list of 9 connection brokers and information regarding pre-established connections.

Each broker in a datacenter, when receiving a site request, is responsible for fan out of the site request into local requests to each of the other installations in the site. For example, broker 122 is responsible for turning the site request into a local request to send to each of its virtualization infrastructure installations, pods, 123, 126, and 128. Each local request designates a list of all of the connection brokers in the target pod, so that any one of the connection brokers can respond, and the first to respond with the requested state provides the answer for that installation. Thus, for example, when the site request 141 is sent to site 120, via a connection to broker 122 in pod 123, the receiving broker 122 determines (realizes, calculates, computes, etc.) that it is a site request to fan out, and generates and forwards corresponding local requests to installations 126 and 128. The local request sent to installation 126 is sent to a request target list with broker 125 first on the request target list as shown. Similarly, the local request sent to installation 128 is sent to a request target list with broker 127 first on the request target list as shown. A connection iterator executing on broker 122 controls failover to a next broker on the list when the targeted broker is unresponsive or unavailable. Site request 142 is handled similarly. The connection broker 133 receiving the site request, determines that it is a site request to fan out, and generates and forwards a corresponding local request to installation 136. The local request sent to installation 136 is sent to a request target list with broker 135 first on the request target list as shown. A connection iterator executing on broker 133 controls failover to a next broker on the list when the targeted broker is unresponsive or unavailable. As noted earlier, the requests sent via each local request and to each site request could vary. In any case, the broker receiving the responses from the local requests, accumulates (aggregates, composes, combines, etc.) the responses into a single response to the site request, which is ultimately returned to the requesting installation 114.

Figure 2:
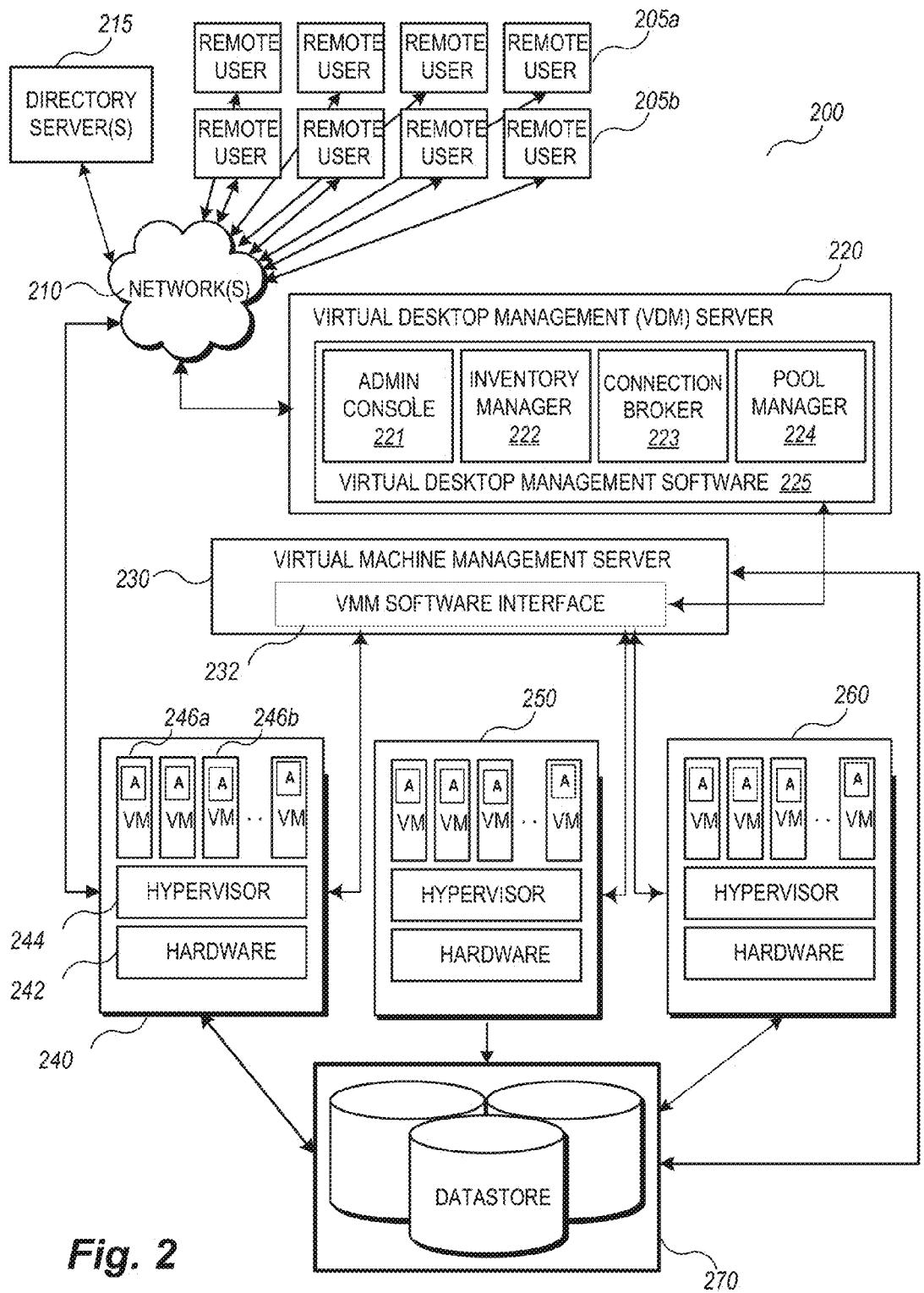
FIG. 2 is a block diagram illustrating use of an example general virtualization infrastructure installation for executing components of an example Wide Area Network Aggregation System in the computing environment illustrated in FIG. 1.

As noted above, a pod is a unit of infrastructure, and in the virtualization context may be a single installation, such as a VMWARE® VIEW (or VMWARE HORIZON VIEW™) installation. FIG. 2 is a block diagram illustrating use of an example general virtualization infrastructure installation for executing components of an example Wide Area Network Aggregation System in the computing environment illustrated in FIG. 1.

As shown in FIG. 2, remote users, for example users 205*a* and 205*b* may access centrally-managed user desktops, such as those implemented by virtual machines running in a datacenter, using network 210 (e.g., a local area network, or other private or publically accessible wide area network, such as the Internet) through any number of different types of devices. These virtual machines (VMs) are complete computation environments, containing virtual equivalents of the hardware and system software components of a physical system and are typically implemented by an extensive virtualization infrastructure, which includes a variety of software and hardware components.

The term "desktop," refers to a human interface environment through which users can launch, interact with, and manage applications, settings, and/or data, etc. Virtualized desktops may export user interfaces, e.g., keyboard and mouse input, audio and visual output, to the user from virtual machines running remotely (in the datacenter) or locally on the client, or, in some cases, using a hybrid. In the case of virtualization environments, the client side of the "desktop" typically includes a bitmap representation of the desktop running—wherever it is being run. Input to and output from the virtualized desktop are reflected in the bitmap representation on the client as it occurs on the virtualized desktop.

Remote access to virtualized desktops is generally provided to client devices through a Virtual Desktop Management (VDM) Server 220. The VDM Server 220 provides "virtual desktops" to the remote user devices, and manages the corresponding virtual machines through communications with a software interface 232 of a Virtual Machine Management Server (VMMS) 230. The Virtual Machine Management Server (VMMS) 230 is responsible for provisioning and maintaining the multitude of Virtual Machines (VMs) implemented across potentially a multitude of physical computers, such as computer 240, 250, and 260. When a user wishes to access an existing virtual machine, the user establishes a connection through the VDM Server 220, and a virtual desktop is presented (as a user interface) on the user's client device, through which communications are made with the underlying virtual machine. Component 223, the connection broker, represents the broker referred to in FIG. 1. Thus, a single virtualization infrastructure installation referred to herein, may comprise multiple instances of the architecture demonstrated in FIG. 2.

In the example shown, as implemented for example, by VMware Inc.'s virtualization infrastructure architecture 200, each physical computer, for example computer 240 contains the underlying hardware 242, virtualization software (here a hypervisor 244), and one or more virtual machines, for example VM 246*a* and VM 246*b*, which each contain Agent Software (guest system software) labeled here as "A" in each VM box. The Agent Software is typically responsible for connecting each VM to the VDM Server 220 and manages each desktop connection. It typically notifies the VDM Server 220 upon each login, logoff, and disconnect. The Agent Software also provides support for remote devices such as USB devices, etc.

The VMMS 230 typically manages pools of compute resources used to run virtual machines on a set of clusters typically containing multiple servers with CPUs, memory, and communications hardware (network). A virtual computer (a virtual machine or VM), when active, consumes physical compute resources and is managed by a hypervisor layer, such as hyperviser 244 running on physical computer 240. The hypervisor manages physical resources as well as maintains virtual-to-physical hardware mappings. While some VMMS specialize in virtual machine management, such as VMware's VirtualCenter, Microsoft's Virtual Machine Manager, Citrix's XenCenter, others can manage both physical and virtual computers, such as IBM's Director, HP's OpenView and Microsoft's System Center Suite.

The Software Interface 232 running on the VMMS 230 communicates with these hypervisors (e.g., hypervisor 244) to provision and manage each VM. For example, according to traditional virtualization techniques, when a remote user (e.g., user 205*a*) requests access to a particular existing desktop, the VDM Server 220 (through its software 225), communicates with the VMMS through its software interface 232 to start the corresponding VM executing on an appropriate physical computer, and to relay the user interface exported by the VM to the remote user so that the user can interact with the desktop. In some instances (e.g., according to administrator policies), when the desktop is exited, or otherwise shutdown, the VDM Server 220 communicates with the VMMS 230 to save the VM image to the datastore 270 as appropriate and to de-allocate physical and VM system resources as needed.

In general, the VMMS Server 230 provides interfaces 232 to enable other programs, such as the Pool Manager 224, to control the lifecycle of the various virtual machines that run on a hypervisor. For example, it supports operations for
   1) the discovery of compute, storage, and network resources;
   2) creation of logical compute pools (as discussed below) by providing features such as automatic CPU and memory load balancing;
   3) provisioning/creation of one or more virtual disks, on local or shared storage—clones with full or sparse disks;
   4) creation of virtual machines anchored to a base virtual machine—for example, linked clones using REDO disks; and
   5) power operations on virtual machines (power on, power-off, suspend, resume, checkpoint, etc), etc.

In one example existing virtualization infrastructure providing by VMware Inc., a Virtual Desktop Management (VDM) Server 220 includes an Administrative Console 221, an Inventory Manager 222, a Connection Broker 223, and a Pool Manager 224. The Connection Broker 223, allows a remote user, such as remote user 205a, through a client device to select a type of virtualized desktop and initiate a desktop session or to access an existing connection to a virtualized desktop.

The Inventory Manager 222 maintains a mapping of different user belongings in the system. For example, user may be entitled to certain applications; may have access to more than one desktop, etc. The Inventory Manager 222 also keeps track of the running virtual desktops in the system. The mappings may be stored using any number of mechanisms, including using one or more directory servers 215 accessible through network 210.

The Pool Manager 224 component manages the complete lifecycle of virtual desktops. Desktops in a pool are grouped together based on similar software requirements. Desktop Administrators create logical desktops groups (desktop pools) that are provisioned typically from the same base image, including the Agent Software. For example, a desktop pool may include virtual machines that run the same set of software applications and run the same operating system. As yet another example, a desktop pool may contain a set of cloned virtual machines that are identical in every aspect but are customized to include unique identity that includes for example, a unique computer name, IP/MAC Address, Domain membership, Software license serial numbers, OS specific security identifiers among other things. The base image can be a virtual machine or a template virtual machine that is created and/or managed by the VMMS 230.

The software state of all the virtual machines in a desktop pool may be persistent or non-persistent. Persistent desktops maintain the state of the files or applications stored inside the virtual machines. Non-Persistent desktops are stateless desktops; the desktop state is restored to the original state after every user session. In some cases, the Desktop Administrator can define how frequently the "revert to golden state" operation should be performed. The restore to pristine image or revert to golden state operation can also be scheduled to occur based on certain conditions.

The Administrative Console 221 typically provides a user interface for a Desktop Administrator to manage the configuration of desktop pools, define user access policies, manage ongoing maintenance, software installed in the desktops, etc. For example, the Administrative Console 221 may permit the Desktop Administrator to: create desktop pools; associate desktop pools with a VMMS 230; provide other details such as the compute resources (hosts, clusters) needed to run the VMs, logical resource pools (e.g., VI DRS Resource Pools) for load balancing, type of memory sharing configuration (e.g., reserve memory for virtual machines or use memory overcommit), storage used to provision the VMs (identifying one or more datastores), guest customization details like a custom naming scheme for VMs in the pool (e.g., a "marketingxxxx" custom name such that the VMs in the pool are called marketing0001 to marketing9999), domain membership info (e.g., to add VM to domain vmware-vdi.com), etc.; associate a desktop pool with a master image or template; define VM state policies (keep VMs powered-on, suspend VM when user logs off, etc.); set up custom messages to be sent to end users when the desktops are put into maintenance mode (e.g., for weekly patches, hotfixes, etc.); and/or manage the application registration and load process.

The Directory Server 215 stores the persistent state required for managing the virtual desktops. For example, the VMs in a desktop pool maybe associated with one or more users. The user identifiers for a pool may be stored in the directory server 215. The users may also be referenced through an external directory server such as—Microsoft Active Directory, Novell eDirectory, IBM Tivoli Directory Server, etc. In one example implementation, the directory server 215 may contain state for:

1) Desktop Pools: details like the display name of the pool, e.g.,—marketing desktops, the number of desktops required in the pool, default power state of the pool (powered-on, suspended, configured to transition to low power states like ACPI S1/ WoL, powered-off, etc), pool creation date, etc.;
2) Disk type for a virtual machine—full disk, sparse datastores for each desktop pool, etc.;
3) Disk replication using REDO disk approach, linked clone or synchronized clone, etc.;
4) Type of virtual disk to be stored on datastore—user data disk, OS disk, guest page file, vmkernel swap file, etc.;
5) Details of virtual machines created in the pools—unique computer name, identifier and inventory location in VMMS, unique reference identifier on VMMS, etc.;
6) Users: unique identifier for user accounts, external references to Active Directory Server, Novell eDirectory, etc.;
7) Entitlements: mappings between users, applications, and desktops;
8) Policies—indications of types of devices available, default monitor configurations (single, dual), screen resolution, etc.; and
9) Audit events—for example, lock out if three successive login attempts fail, time of access, type of access device, etc.

Examples and details of variants of virtualization architectures, such as that described with reference to FIG. 2, can be found in U.S. patent application Ser. No. 11/395,012, entitled Virtualized Desktop Allocation System Using Virtual Infrastructure, filed Mar. 31, 2006; U.S. patent application Ser. No. 12/058,269, entitled Synchronized Clones, filed Mar. 28, 2008; and in U.S. Patent Publication No. 2009/0216975, entitled Extending Server-Based Desktop Virtual Machine Architecture to Client Machines, filed Feb. 23, 2009.

As described above, each aggregate request generated by a client using the WANA API may be transformed into one or more site requests that are transmitted in parallel to all of the other remote sites (e.g., datacenters) that are configured to be connected to the source (or "host") site via a WAN. In one example WANAS, a connection between each of the sites is established (ahead of time, e.g., pre-established) before the transmissions occur and may even be, practically speaking, "permanent" between sites. That is, from the source site's perspective, a connection to each remote site is always available, although the exact connection configuration—which server is the endpoint of the connection—may vary based upon configurations controlled by a the local connection manager at the server. Supporting pre-established connections removes connection setup cost at request time. Other example WANASes may support just-in-time connections, or other configurations.

In an example WANAS, a connection manager is responsible for managing the life cycle of all of its connections over the WAN and will load balance and rotate as needed between servers over time. The connection manager may even pool connections, allowing for their re-use for multiple (potentially concurrent) requests. In addition, pod health may be used to determine which endpoints may be better candidates for connection attempts. It can use health information to determine which endpoints are available and which are not available for connection, helping to reduce the failure rate for connection attempts. The connection manager may even proactively load balance requests across a set of endpoints by creating new connections to endpoints in advance of them being needed and retiring old connections when an equivalent connection is available. In this way, a particular requesting server may "cycle" around the possible endpoints in a target of a site request. Since most endpoints are also requestors of other site and/or local requests, endpoint load can accordingly be spread across all endpoints and newly available endpoints can handle their share of the request load. As mentioned, in one embodiment, a connection manager is associated with the server. In other embodiments, connection managers may be associated with sites, groups of servers, etc.

Figure 3:
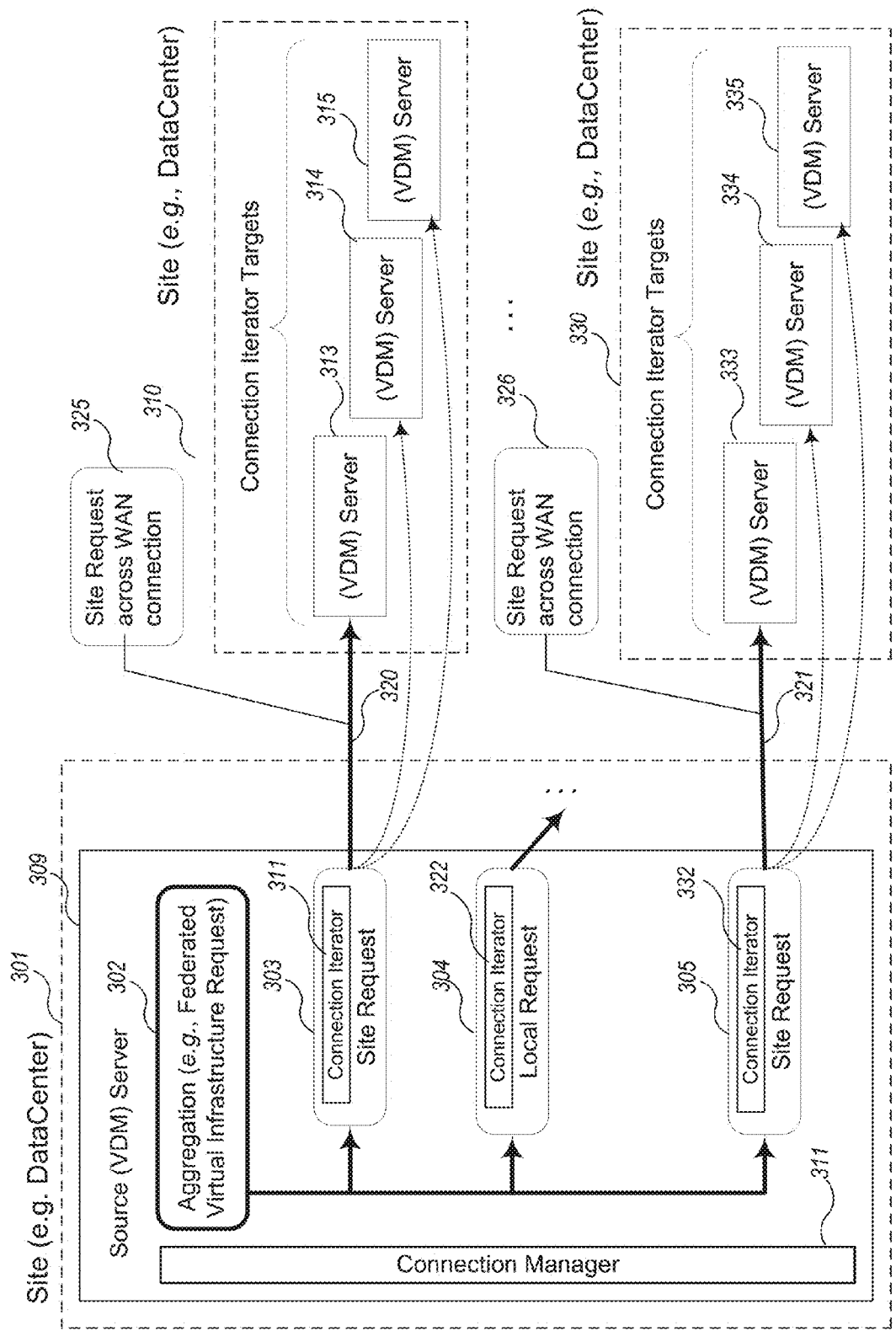
FIG. 3 is a block diagram of an example aggregation request transformed into further request and message components as sent to connected computing sites and components for executing example Wide Area Network Aggregation technology.
Figure 4A:
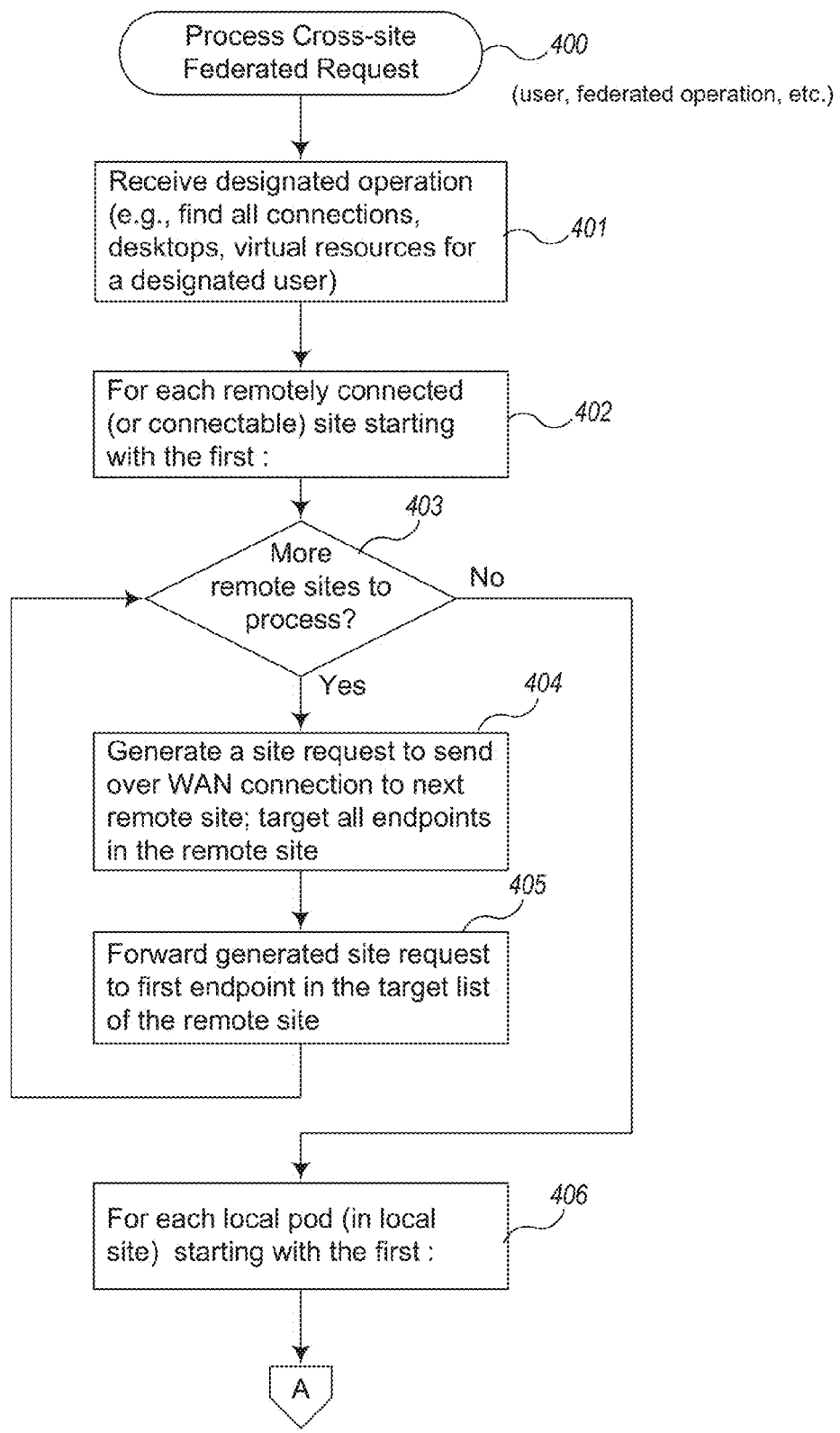
Figure 4B:
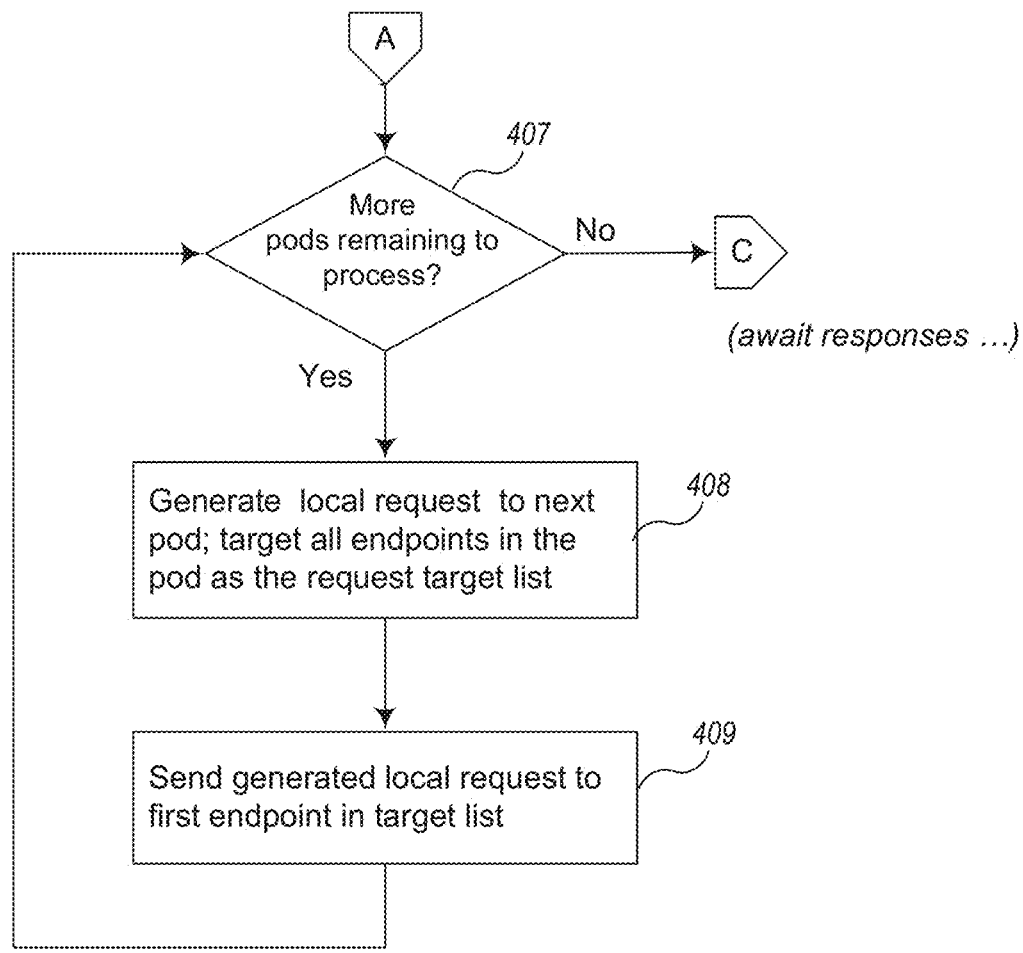
Figure 4D:
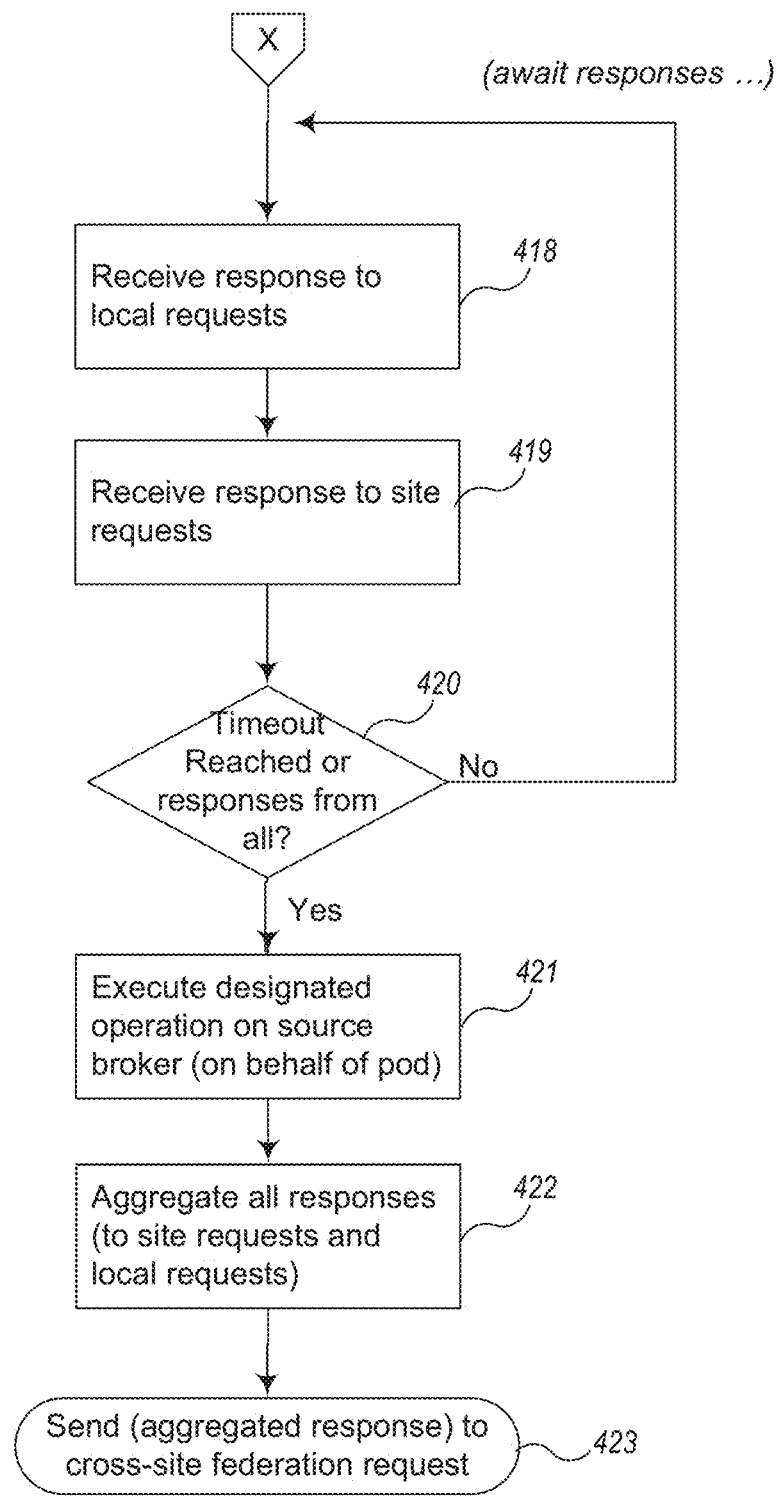

FIG. 3 is a block diagram of an example aggregation request transformed into further request and message components as sent to connected computing sites and components for executing example Wide Area Network Aggregation technology. In this illustration, site 301 is connected via WAN to three other sites, only two of which—site 310 and site 330—are shown in the Figure. Site 301 is considered the "source" site for the initial client request. The client request is made in the form of "aggregation" ("aggregate request" or "aggregation request") 302, which, in a virtualization system, may be a federated virtualization infrastructure request. In an example WANAS, an API is exposed to clients that implements the aggregation requests described here. Aggregation API call 302 is implemented by the WANAS API to be transformed into a site request for each remote site and a local request for each pod within the source site, as shown in FIG. 1. FIG. 3 shows that site request 303 is sent via connection 320 to a server (e.g., VDM server 313) within site 310 and site request 305 is sent via connection 321 to a server (e.g., VDM server 333) within site 330. Site request 304 is also sent via a connection to a remote site, but the connection, site, and other information is not shown for readability. In this example, the further transformations into local requests to be forwarded within the pod are also not illustrated.

A cross-WAN connection 320 is initially set up between a source server (VDM server 309) on site 301 and server 313; however, these other connections between source server 309 and between server 314 or server 315 may be used (or set up as needed in some configurations) to effectuate the site request as indicated by the dotted lines. Recall that a connection iterator associated with the request at the source end is responsible for such failover to other servers targeted in the request as needed. Similarly, WAN connection 321 is initially set up between a source server 309 on site 301 and server 333; however, other connections between source server 309 and between server 334 and 335 may be used (or set up as needed in some configurations) to effectuate the site request as indicated by the dotted lines. Connections 320 and 321 are controlled by a connection manager component 311 associated with the source server 309 on site 301. The connection manager 311 is responsible for the life cycles of connections to other servers and may perform functions described above such as load balancing, rotating connections between the pods to reduce chance of failure, and the like.

As mentioned with respect to FIG. 1, the aggregation 302 may also result in one or more local requests within datacenter 301. For example, if there are additional pods (installations) within datacenter 301, the aggregation will generate a local request to each of these pods. Local request 304 exemplifies one such local request. It has its own iterator 322 which is used to iterate as needed through a target list of local (VDM) servers (not shown) within site 301. There is one such local request for each pod.

The site request once received, for example request 325 and 326 is then further transformed into inter-pod messages, referred to here as "local requests" to produce the parallelism, or "fan out" referred to earlier. That is, the server that receives the site request, will determine that it is a high level request that needs to be further distributed to the other pods in the site in order to determine an answer to the site request. This can be done recursively (or equivalently by iteration), as each server knows that it has either received a site request and needs to produce fanned out requests, or it has received a local request and needs to perform the requested operation, which may be for example, to determine status of a requested resource, open a connection to a virtual machine, etc. Some typical requests in a virtualization environment include:

DisconnectSession
GetPodHealth
GetUserinfo
KillSession
LaunchDesktop
PingEndpoint
QuerySessions
ResetSession
SendMessage
SetUserSettings As will be described further below, each local request is further directed as a sub-request (e.g., a message) to a specific endpoint (one of the servers on the request target list) with a specific operation request. The results from the local requests are aggregated by the server that received the site request, which then responds to the site request.

The fan out yields advantages with respect to the latency of federated operations. Because each local request can be generated and sent out at approximately the same time (near concurrently), the processing of performing the federated operation is done in parallel. This ultimately reduces the time needed to respond to the user who was, for example, merely trying to find out what desktops the user was already running It is notable for failover purposes that any server can be used as a representative of the site in order for communication to occur. Similarly, local requests are generated to a pod with a list of targets that are equivalently able to respond to the request. Thus, unlike a traditional message which has an explicit endpoint that must be available in order to respond, the local requests generated in response to a site request to produce pod message "fan out" have a list of endpoints that can handle the local request and thus provide additional failover capabilities. Each site and each local request has a connection iterator, for example connection iterators 311, 322, and 332, which help deliver an actual message (e.g., a LAN message) to a specific endpoint that is ready and able to respond. These actual messages constitute sub-requests. More than one sub-request may be needed and sent if the connection iterator detects that a sub-request to a specific endpoint has failed.

Although the techniques of wide area network aggregation are generally applicable to any type of distributed task across wide area networks, the phrase federated operation is used generally to imply any type of operation that can be distributed and not just tasks within virtualization environments. Essentially, the concepts and techniques described are applicable to any type of distributed operation that promulgates requests across a wide area network. Also, although certain terms are used primarily herein, other terms could be used interchangeably to yield equivalent systems and examples. In addition, terms may have alternate spellings which may or may not be explicitly mentioned, and all such variations of terms are intended to be included.

Examples described herein provide applications, tools, data structures and other support to implement a Wide Area Network Aggregation System to be used for distributing virtualization operations. Other examples of the described techniques may be used for other purposes, including for federated tasks more generally. In the following description, numerous specific details are set forth, such as data formats and code sequences, etc., in order to provide a thorough understanding of the described techniques. The examples described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like FIGS. 4A, 4B, 4C, and 4D are an example flow diagram of computing logic to process an aggregation request across multiple computing sites by sending local and site requests. For example, this logic may be invoked from a "client" (source) site, in particular, a source broker on a server of the client site, to begin a federated operation such as "find me all of the running virtual desktops of user U." As will be recalled from FIG. 1, the source broker interprets the user request and invokes an API of the WANAS to formulate an aggregation request. FIGS. 4A through 4D illustrate the logic invoked to process the aggregation request.

In block 401, the logic receives a designated operation from the aggregation request such as a federated operation relating to virtualization resources, for example a status request or a provisioning request. Identification of the user and other parameters may also be designated in the API call.

In blocks 402-405, the logic executes a loop to transform the aggregation request to one or more (inter-)site requests. In particular, in block 402, the logic starts the loop by choosing a remote site as the "current" site to send a request to. As described earlier, the remote site is a physically disparate site, and may, for example, be a datacenter remotely located from the client site. Each source broker can consult information, e.g., network topology data, to determine a list of brokers configured for each remote site. Further, the source broker can query its connection manager to determine to which broker endpoints in the remote site the source broker already has an established connection, and to determine those connections to use in preference to others. In the case where no connections yet exist from the source broker to a broker in the remote site, the logic can request a new connection to an endpoint in the remote site.

In block 403, the logic determines whether there are still more remote sites to process, and if so, continues in block 404 otherwise continues in block 406 to generate and process local requests within the source broker's site. In particular, in block 404, the logic generates a site request to send to a server (e.g., connection broker executing on the server) in the remote site. As described, this request is preferably sent via a pre-established connection to a (broker) endpoint in a server of the remote site being processed; however, the request is sent to a target list of all the broker endpoints present in the remote site, since any one of the brokers can act as a representative (e.g., can substitute for the other, are equivalent, act as a proxy, etc.) for processing the site request. Again, to which broker endpoint to send the request is chosen with the aid of a connection manager associated with the source broker. If this connection fails for whatever reason and the broker endpoint that is connected doesn't process the site request in a timely manner (e.g., by a configurable time-out period), then the source broker can reissue the request using a different broker endpoint from this target list.

In block 405, the logic forwards (e.g., sends, transmits, etc.) the generated site request to the initially targeted broker endpoint and then returns to the beginning of the loop in block 403 to process the next remote site.

In blocks 406-409, the logic executes a loop to transform the aggregation request to one or more local (pod) requests as appropriate. In particular, as described with reference to FIG. 1, site requests are sent to remote sites, and local (pod) requests are sent to pods with the source site that are other than the pod that contains the source broker. (See, for example, requests 143 and 144 in FIG. 1.) In block 406, the logic determines whether there are other pods (other than the pod containing the source broker) within the client site that also need to be queried and starts the local request loop by choosing a local pod to send a request to. In block 407 the source broker logic determines whether there are still other pods remaining to be processed and, if so, then the logic continues in block 408, otherwise it awaits responses to the requests already sent and continues to block 410.

In block 408, the logic generates a local request to each such determined pod and specifies, as a target list of endpoints, all of the broker endpoints in that pod. Like the site request target list, the target list of the local request contains a set of equivalent (e.g., representative, substitute, proxy) broker endpoints that can respond to the local request. The local request may potentially be in a format different from the site requests formulated above in block 404. In block 409, the logic then sends the generated local request to the initially targeted broker endpoint in the "current" pod. The logic then continues back to the In block 410, the logic awaits (a separate) response from each site request and from each local request. Typically, the logic executes a timer based event handler where either a response from one of the requests triggers processing or a timeout for that request is triggered. Blocks 411 through 417 describe the logic executed to either process a response or iterate over the set of potential target broker endpoints for a particular request (local or site). This iteration, as described with respect to FIG. 3, is typically executed by a connection iterator associated with each request. Different implementations may yield slightly modified logic.

In block 411, after the logic detects that a response to a request has arrived or a corresponding timeout has been triggered, the logic determines in block 412 whether a timeout has triggered an event and, if so, continues in block 413, otherwise continues in block 415.

In block 415 the logic determines whether it has received a response to a local request or a site request. If so, then in block 417, the logic determines that it has received a result for that request and returns it as the result of that request. If not, then no result has been received, a timeout has not occurred, but a response was received, so it was likely a failed result, and the logic continues in block 416 to return a failure code for that request. (Note that this block would not be reached unless some sort of response was returned, or a timeout occurred, otherwise the request would still be "pending a response.")

In block 413, after it is determined that a timeout for a particular request has been triggered, the logic determines whether there are additional (equivalent) broker endpoints in the target list of the request that can be tried, and, if so, continues in block 414 to send the request to a next endpoint in that target list and reset the timeout for the request. Otherwise, the logic determines that there are no further equivalent endpoints in the target list and so in block 416, the logic returns a failure code for that request.

Of note, the logic in blocks 411 through 417 is processed for each request. In some embodiments, the timeouts are configurable and may be on a request level, per request type, etc. To aid in correlating a response with a particular request, a correlation identifier (ID) may be indicated in each request and in each response. In addition, each request instance (a message to a particular endpoint) may contain other values such as a message header and/or a message body, either of which may comprise key-value pairs giving information about the request.

Once all of the responses (including results and/or failure codes) have been determined for each of the requests, the logic proceeds to block 418. In block 418, the logic receives the responses to local requests and in block 419, the logic receives the response to the issued site requests. In block 420, the logic determines whether an overall (configurable) timeout has occurred for the aggregation, and, if not, continues to await responses, otherwise continues in block 421.

In block 421, the logic performs the designated operation (see block 401) on the source broker, which represents a result for the client (source) pod. Of note, this logic can be performed at different times and much earlier in the overall flow if desired. In block 422, the logic aggregates (e.g., accumulates, adds, sums, collects, etc.) all of the responses to the site and local requests with the local result for the source pod. In block 423, the logic sends (returns, forwards, etc.) the aggregated response as the response to the aggregation (federation) request, which is a response to the API call.

Figure 5A:
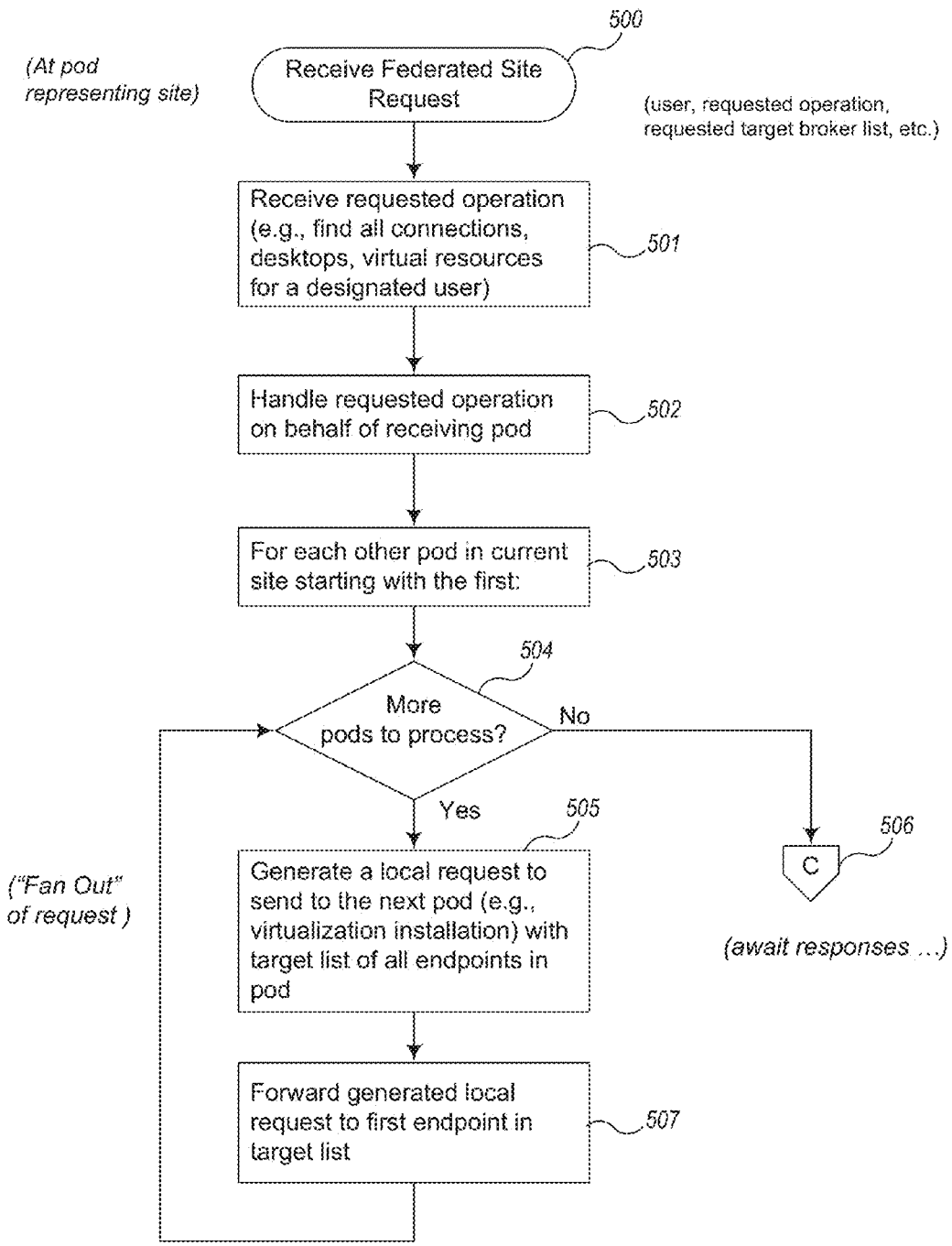
FIGS. 5A and 5B are an example flow diagram of computing logic to process a received site request for performing a federated operation.
Figure 5B:
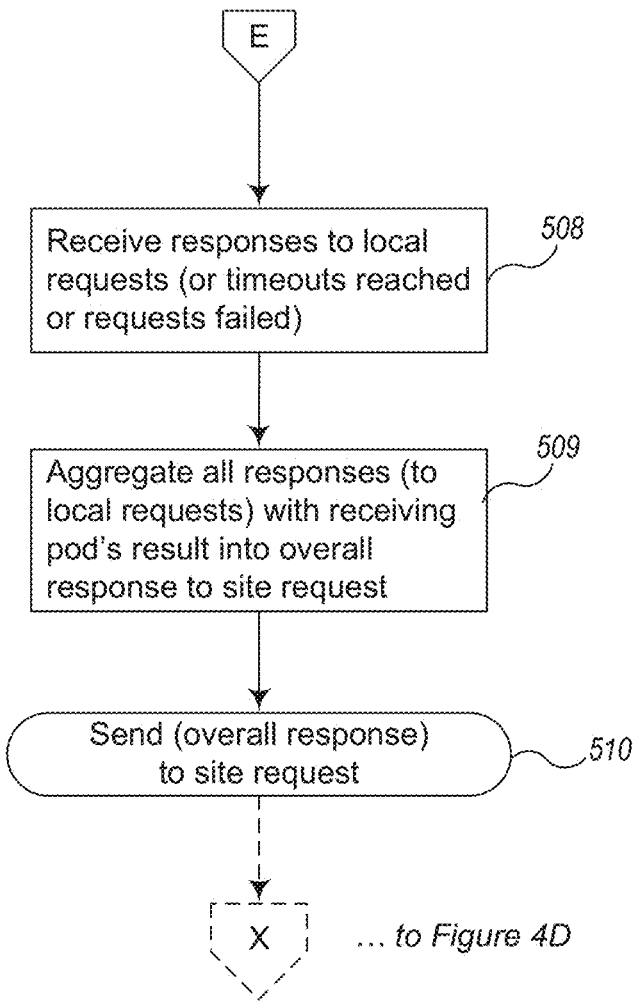

FIGS. 5A and 5B are an example flow diagram of computing logic to process a received site request for performing a federated operation. For example, this logic may be invoked from a remote site to respond to a site request as generated and forwarded in blocks 404 and 405 of FIG. 4A. As explained earlier, a server (e.g., connection broker endpoint) receiving such as request will be able to distinguish whether it is a site request, and if so handle it according to the logic of FIGS. 5A and 5B, or whether it is a local request, and if so handle it according to the logic of FIG. 6.

More specifically, in block 501, the logic receives a site request with the requested operation and any other parameters sent in the request. The requested operation and parameters need not be identical to those specified in the initial aggregation request.

In block 502, the logic processes the requested operation (e.g., get the status of all of user "U"s connections) at the receiving broker on behalf of the receiving pod. Recall that if this request fails or timeout, the source broker will reissue the request using the logic of FIG. 4C to a different broker endpoint of the receiving pod, or even a different pod in the receiving remote site. This operation may be performed at many different times in the logic of processing the site request.

In blocks 503-507 the logic executes a loop to transform the site request to one or more local pod requests to the other pods of the receiving site. This constitutes the "fan out" of the site request to all of the pods present and available in the receiving site. In particular, in block 503, the logic starts the loop by choosing a first pod as the "current" pod to send a request to. If a request needs to be sent to every other pod in the site, the order the pod requests are processed may not matter. In block 504, the logic determines whether there are still more pods to process and if so, continues to block 505, otherwise continues to await responses at marker 506 (to block 410 of FIG. 4C).

In block 505, the logic generates a local request to forward to the pod being processed, for example a current designated virtualization installation. The local request is generated with a target list of a set of equivalent broker endpoints present in that pod (for example, all of the connection brokers in a single virtualization infrastructure installation).

In block 507, the logic forwards the generated local request to the pod being processed, and then returns to the beginning of the loop in block 504 to process the next pod in the receiving cite. As explained above, although the loop shown here initiates these local requests one after another, they are preferably initiated as much as possible in parallel and executed by the individual pods virtually simultaneously. The intent is to provide "parallel" processing of local requests. In other words, they are not intended to be executed sequentially when one desires to obtain the best performance possible out of the WANAS.

As described with reference to FIG. 4C, the pod that has received the site request then awaits responses to the fanned out local requests. The logic reissues local requests to a different broker endpoint in the other pod when a timeout occurs or the request fails. This logic continues until responses (or failed requests) have been received.

Specifically, in block 508, the logic detects that a response to one or more local requests has been received and continues in block 509. In block 509, the logic aggregates (e.g., accumulates, adds, sums, collects, etc.) the responses to all of the local requests with the local result into an overall response to send in response to the received site request and in block 510 returns this overall response. Marker "X" shows the response being returned into block 418 of FIG. 4B.

Figure 6:
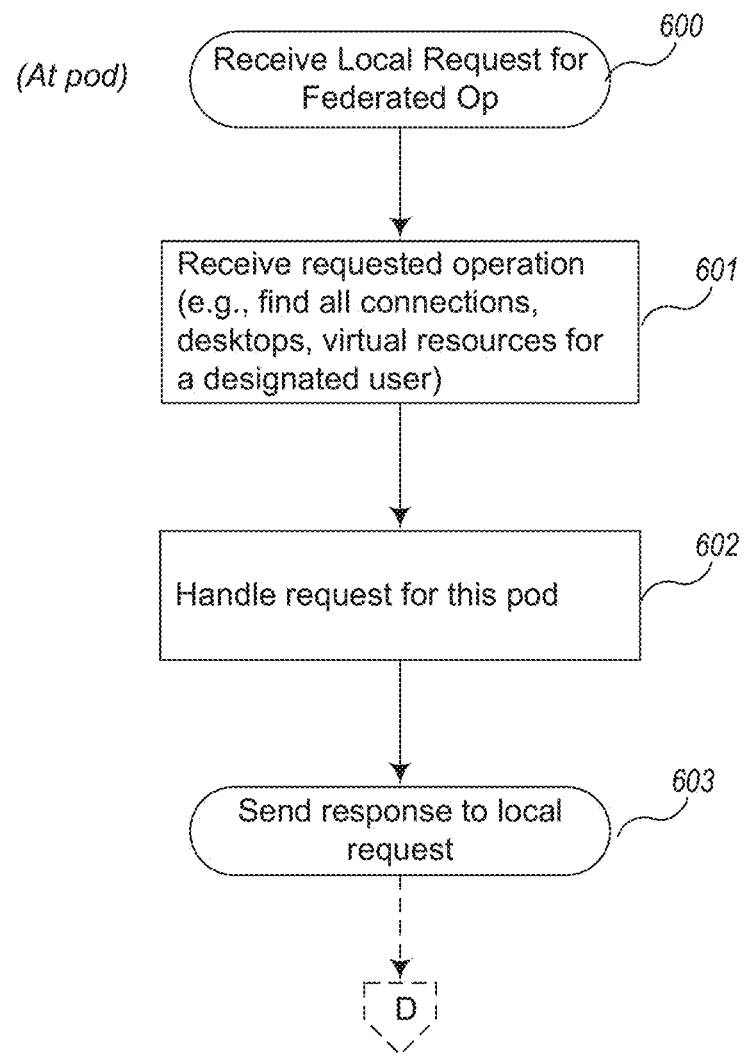
FIG. 6 is an example flow diagram of computing logic to process a local request within a broker endpoint of a pod in a computing site for performing a federated operation.

FIG. 6 is an example flow diagram of computing logic to process a local request within a broker endpoint of a pod in a computing site for performing a federated operation. In particular, FIG. 6 illustrates the logic executed by a server in a pod (e.g., a connection broker of a VDM server) that is able to execute or perform the requested operation. As explained with reference to FIGS. 1 and 3, each local request is processed by the receiving broker. A connection iterator at the source of the request is responsible for forwarding the request to a next server on the request target list if the targeted broker is not responsive, and so on, until a server (e.g., connection broker) responds or the list is exhausted. To do this, the connection iterator resends the local request to a different designated broker endpoint on the target list of the local request (recall that the target list contained a set of equivalent broker endpoints that could process the request on behalf of the pod).

In particular, in block 601, a designated (representative) server of a pod receives a local request with a requested operation.

In block 602, the receiving broker handles the received requested operation on behalf of the receiving pod. In block 603, the receiving broker sends the result as a response to the local request and proceed as marker D (block 411 of FIG. 4C which describes a triggered event resulting from a result being generated). In FIGS. 4A-4D, 5A-5B, and 6 illustrate example logic of the site request and local request fan out. Other logic, which captures more of the recursive nature of the requests can be substituted for the logic shown herein.

Figure 7:
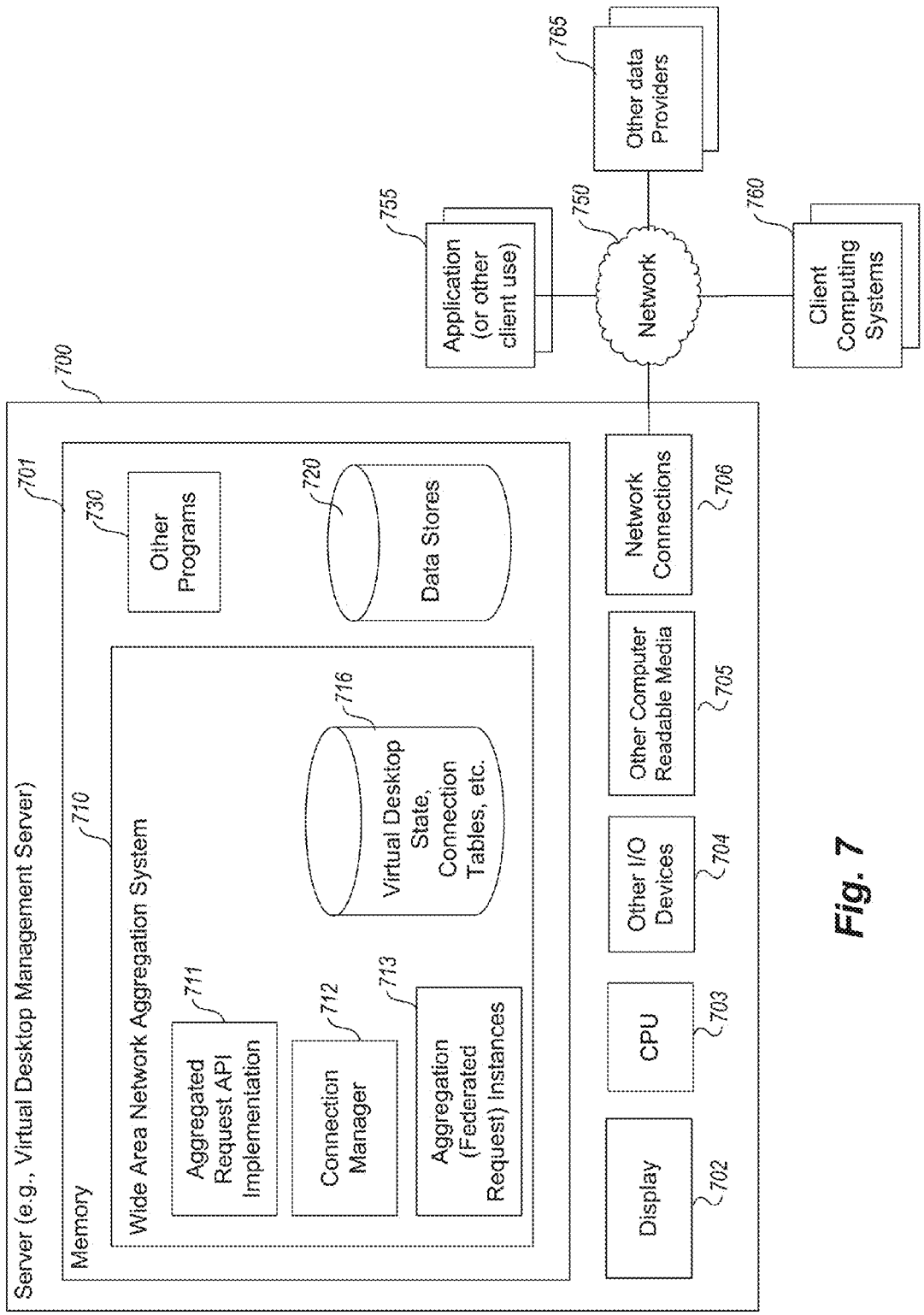
FIG. 7 is an example block diagram of a computing system for practicing an example Wide Area Network Aggregation System.

FIG. 7 is an example block diagram of an example computing system that may be used to practice examples of a Wide Area Network Aggregation System described herein. Note that a general purpose virtual or physical computing system suitably instructed or a special purpose computing system may be used to implement an WANAS. Further, the WANAS may be implemented in software, hardware, firmware, or in some combination to achieve the capabilities described herein.

The computing system 700 may comprise one or more server and/or client computing systems and may span distributed locations. In addition, each block shown may represent one or more such blocks as appropriate to a specific example WANAS or may be combined with other blocks. Moreover, the various blocks of the WANAS 710 may physically reside on one or more machines, which use standard (e.g., TCP/IP) or proprietary interprocess communication mechanisms to communicate with each other.

In the example shown, computer system 700 comprises a computer memory ("memory") 701, a display 702, one or more Central Processing Units ("CPU") 703, Input/Output devices 704 (e.g., keyboard, mouse, CRT or LCD display, etc.), other computer-readable media 705, and one or more network connections 706. The WANAS 710 is shown residing in memory 701. In other example WANASes, some portion of the contents, some of, or all of the components of the WANAS 710 may be stored on and/or transmitted over the other computer-readable media 705. The components of the WANAS 710 preferably execute on one or more CPUs 703 and manage the generation, propagation, and operation of federated operations, as described herein. Other code or programs 730 and potentially other data repositories, such as data repository 720, also reside in the memory 701, and preferably execute on one or more CPUs 703. Of note, one or more of the components in FIG. 7 may not be present in any specific implementation. For example, some example WANASes embedded in other software may not provide means for user input or display.

In a typical example, the WANAS 710 includes one or more Application Programming Interfaces ("API") 711, one or more connection managers 712, and one or more aggregation (federated request) instances 713. In at least some examples, some components are provided external to the WANAS and available, potentially, over one or more networks 750. Other and/or different modules may be implemented. In addition, the WANAS may interact via a network 750 with application or client code 755 that uses results of the performed federated operations, one or more client computing systems 760, and/or one or more third-party information provide systems 765, such as purveyors of some of the virtual information used in virtual desktop state, connection tables, etc. data repository 716. Also, of note, the state data repository 715 may be provided external to the WANAS as well, for example in a knowledge base accessible over one or more networks 750.

In an example WANAS, components/modules of the WANAS 710 are implemented using standard programming techniques. For example, the WANAS 710 may be implemented as a "native" executable running on the CPU 103, along with one or more static or dynamic libraries. In other example WANASes, the WANAS 710 may be implemented as instructions processed by a virtual machine. A range of programming languages known in the art may be employed for implementing such example example WANASes, including representative implementations of various programming language paradigms, including but not limited to, object-oriented, functional, procedural, scripting, and declarative.

The example WANASes described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some example WANASes may execute concurrently and asynchronously and communicate using message passing techniques. Equivalent synchronous examples are also supported.

In addition, additional programming interfaces to the data stored as part of the WANAS 710 (e.g., in the data repository 716) can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 716 may be implemented as one or more database systems, file systems, or any other technique for storing such information, or any combination of the above, including implementations using distributed computing techniques.

Also portions of an example WANAS 710 may be implemented in a distributed environment comprising multiple, even heterogeneous, computer systems and networks. Different configurations and locations of programs and data are contemplated for use with techniques of described herein. In addition, the server may be physical or virtual computing system and may reside on the same physical system. Also, one or more of the modules may themselves be distributed, pooled or otherwise grouped, such as for load balancing, reliability or security reasons. A variety of distributed computing techniques are appropriate for implementing the components of the illustrated WANAS in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an WANAS.

Furthermore, in some examples, some or all of the components of the WANAS 710 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other examples. Accordingly, examples described in this disclosure may be practiced with other computer system configurations.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

From the foregoing it will be appreciated that, although a specific example Wide Area Network Aggregation System has been described herein for purposes of illustration, various modifications may be made without deviating from the spirit and scope of the present disclosure. For example, the methods and systems for performing federated operations discussed herein are applicable to other architectures other than a virtualization specific architecture. Also, the methods and systems discussed herein are applicable to differing protocols, communication media (optical, wireless, cable, etc.) and devices (such as wireless handsets, electronic organizers, personal digital assistants, tablets, portable email machines, game machines, pagers, navigation devices such as GPS receivers, etc.)

The invention claimed is:

1. A computer-implemented method for optimizing communications between computing systems connected via a plurality of wide area networks comprising:
receiving, at a first computing site, an aggregate query that indicates a federated operation to be performed over a plurality of physically disparate and remote computing sites connected via the plurality of wide area networks to the first computing site, each computing site comprising a plurality of computing systems that are capable of communicating with each over high bandwidth connections;
generating a plurality of individual site requests from the federated operation, wherein each site request specifies a requested operation based upon the federated operation and a request target, wherein each request target is a set of equivalent broker endpoints capable of responding to the generated site request, each equivalent broker endpoint of the request target thereby serving as a representative for performing the federated operation on behalf of computing systems of the respective site;
forwarding for execution each generated site request to a different remote computing site to be executed in parallel with each other;
receiving asynchronously, in response to each of the forwarded site requests, a response that contains an aggregate answer to the requested operation of the forwarded site request on behalf of the computing systems of the respective computing site; and
in response to receiving the aggregate query that indicates the federated operation, also generating one or more local requests to be forwarded for execution to one or more computing systems within the first computing site, each of the local requests specifying a requested operation based upon the federated operation and a request target, wherein the request target is a set of equivalent broker endpoints capable of responding to the generated local request; and
forwarding each generated local request to one of the computing systems within the first site;
receiving asynchronously, in response to each of the forwarded local requests, a response that contains an aggregate answer to the requested operation of the forwarded local request; and
combining the received aggregate answers from the forwarded site requests and from the forwarded local requests into an overall response to indicate that the federated operation was performed and to return the overall response to the aggregate query.

2. The method of claim 1 wherein the one or more computing systems within the first computing site are grouped into pods, a local request is generated for each pod, and the generated local requests are forwarded to one of the computing systems in each pod.

3. The method of claim 1, further comprising providing failover for an individual site request by attempting contact with more than one of the equivalent broker endpoints of the request target of the individual site request when a one of the equivalent broker endpoints does not respond in a designated time period.

4. The method of claim 1 wherein two or more of the individual site requests or the local requests comprise different requests.

5. The method of claim 1 wherein the aggregate query specifies at least one of: determining a status of connections for a designated user, determining virtual desktops associated with a designated user, determining a virtual infrastructure resource pertaining to a designated user, provisioning a virtual infrastructure resource pertaining to a designated user, provisioning a virtual desktop session for a designated user, a request to disconnect a session, a request to inquire regarding computing system health, a request to obtain user information, a request to kill a session, a request to ping an endpoint, a request to reset a session, a request to send a message, and/or a request to set user settings.

6. The method of claim 1 wherein the generated site request is forwarded to a remote computing site over a previously established connection between one of the computing systems of the site and the first site.

7. The method of claim 6 wherein the previously established connection is concurrently used with a different generated site request, thereby permitting connection sharing without having to reestablish the previously established connection.

8. The method of claim 6 wherein the previously established connection is re-used for a plurality of different requests.

9. The method of claim 1 wherein an aggregate query supports queries of greater than 100 computing sites or 100 linked pods.

10. The method of claim 1 wherein the aggregate query is received using an application programming interface ("API") that automatically generates the plurality of site requests in response to receiving the aggregate query.

11. A non-transitory computer-readable medium containing content for controlling a computer processor to optimize communications between computing systems connected via a plurality of wide area networks by performing a method comprising:
receiving, at a first computing site, an aggregate query that indicates a federated operation to be performed over a plurality of physically disparate and remote computing sites connected via the plurality of wide area networks to the first computing site, each computing site comprising a plurality of computing systems that are capable of communicating with each over high bandwidth connections;
generating a plurality of individual site requests from the federated operation, wherein each site request specifies a requested operation based upon the federated operation and a request target, wherein each request target is a set of equivalent broker endpoints capable of responding to the generated site request, each equivalent broker endpoint of the request target thereby serving as a representative for performing the federated operation on behalf of computing systems of the respective site;

forwarding for execution each generated site request to a different remote computing site to be executed concurrently with each other;

receiving asynchronously, in response to each of the forwarded site requests, a response that contains an aggregate answer to the requested operation of the forwarded site request on behalf of the computing systems of the respective computing site; and in response to receiving the aggregate query that indicates the federated operation, also generating one or more local requests to be forwarded for execution to one or more computing systems within the first computing site, each of the local requests specifying a requested operation based upon the federated operation and a request target, wherein the request target is a set of equivalent broker endpoints capable of responding to the generated local request; and forwarding each generated local request to one of the computing systems within the first site;

receiving asynchronously, in response to each of the forwarded local requests, a response that contains an aggregate answer to the requested operation of the forwarded local request; and combining the received aggregate answers from the forwarded site requests and from the forwarded local requests into an overall response to indicate that the federated operation was performed and to return the overall response to the aggregate query.

12. The computer-readable medium of claim 11 wherein the medium is a computer memory and the content are computer instructions.

13. The computer-readable medium of claim 11 wherein the one or more computing systems within the first computing site are grouped into pods, a local request is generated for each pod, and the generated local requests are forwarded to one of the computing systems in each pod.

14. The computer-readable medium of claim 11 wherein two or more of the individual site requests or the local requests comprise different requests.

15. The computer-readable medium of claim 11, the method further comprising providing failover for an individual site request by attempting contact with more than one of the equivalent broker endpoints of the request target of the individual site request when a one of the equivalent broker endpoints does not respond in a designated time period.

16. The computer-readable medium of claim 11, the method further comprising:

sharing a connection between broker endpoints for multiple different requests without establishing a session and without reestablishing the connection.

17. A virtualization server of a first computing site connected via one or more wide area networks to other computing systems, comprising:

a computer processor;

a memory; and logic, stored in the memory, and configured, when executed to:

receive an aggregate query that indicates a federated operation to be performed over a plurality of physically disparate and remote computing sites connected via the plurality of wide area networks to the first computing site, each computing site comprising a plurality of computing systems that are capable of communicating with each over high bandwidth connections;

generate a plurality of individual site requests from the federated operation, wherein each site request specifies a requested operation based upon the federated operation and a request target, wherein each request target is a set of equivalent broker endpoints capable of responding to the generated site request, each equivalent broker endpoint of the request target thereby serving as a representative for performing the federated operation on behalf of computing systems of the respective site;

forward for execution each generated site request to a different remote computing site to be executed in parallel with each other;

receive asynchronously, in response to each of the forwarded site requests, a response that contains an aggregate answer to the requested operation of the forwarded site request on behalf of the computing systems of the respective computing site; and in response to receiving the aggregate query that indicates the federated operation, also generate one or more local requests to be forwarded for execution to one or more computing systems within the first computing site, each of the local requests specifying a requested operation based upon the federated operation and a request target, wherein the request target is a set of equivalent broker endpoints capable of responding to the generated local request; and forward each generated local request to one of the computing systems within the first site;

receive asynchronously, in response to each of the forwarded local requests, a response that contains an aggregate answer to the requested operation of the forwarded local request; and combine the received aggregate answers from the forwarded site requests and from the forwarded local requests into an overall response to indicate that the federated operation was performed and to return the overall response to the aggregate query.

18. The server of claim 17 wherein the one or more computing systems within the first computing site are grouped into pods, a local request is generated for each pod, and the generated local requests are forwarded to one of the computing systems in each pod.

19. The server if claim 17, further comprising: providing failover for an individual site request by attempting contact with more than one of the equivalent broker endpoints of the request target of the individual site request when a one of the equivalent broker endpoints does not respond in a designated time period.

20. The server of claim 17 wherein a connection is shared between broker endpoints for multiple different requests without establishing a session and without reestablishing the connection.

* * * * *